(12) United States Patent
Druker et al.

(10) Patent No.: US 10,333,902 B1
(45) Date of Patent: Jun. 25, 2019

(54) DATA SANITIZATION SYSTEM FOR PUBLIC HOST PLATFORM

(71) Applicant: International Business Machines Corporation, Armonk, NY (US)

(72) Inventors: David G. Druker, Salt Lake City, UT (US); Matthew Elsner, Dunwoody, GA (US); Ariel Farkash, Shimshit (IL); Igor Gokhman, Haifa (IL); Brian R. Matthiesen, Cary, NC (US); Patrick R. Wardrop, Austin, TX (US); Ilgen B. Yuceer, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/847,790

(22) Filed: Dec. 19, 2017

(51) Int. Cl.
| G06F 21/00 | (2013.01) |
| H04L 29/06 | (2006.01) |
| G06F 21/62 | (2013.01) |
| G06F 21/60 | (2013.01) |

(52) U.S. Cl.
CPC .......... *H04L 63/0421* (2013.01); *G06F 21/60* (2013.01); *G06F 21/602* (2013.01); *G06F 21/604* (2013.01); *G06F 21/62* (2013.01); *G06F 21/6245* (2013.01); *G06F 21/6254* (2013.01); *H04L 63/0428* (2013.01)

(58) Field of Classification Search
CPC ...... G06F 21/60; G06F 21/602; G06F 21/604; G06F 21/62; G06F 21/6218; G06F 21/6227; G06F 21/6245; G06F 21/6254
See application file for complete search history.

(56) References Cited

U.S. PATENT DOCUMENTS

| 8,938,613 | B2 | 1/2015 | Burch et al. | |
| 2008/0147554 | A1* | 6/2008 | Stevens | G06F 21/6254 705/51 |
| 2014/0059355 | A1* | 2/2014 | Schuette | G06F 21/6218 713/189 |
| 2015/0026462 | A1* | 1/2015 | Ramesh | G06F 21/6218 713/165 |
| 2015/0128285 | A1* | 5/2015 | LaFever | H04L 67/02 726/26 |
| 2017/0104723 | A1 | 4/2017 | Merritt | |
| 2017/0126638 | A1 | 5/2017 | Ye et al. | |
| 2017/0149793 | A1* | 5/2017 | Spertus | H04L 63/105 |

* cited by examiner

*Primary Examiner* — Edward Zee

(57) ABSTRACT

The example embodiments are directed to a system and method for managing blockchain transaction processing. In an example, the method includes one or more of receiving a message transmitted from a client device, the message including a predefined structural format for processing by a service providing computing system, determining a type of the message and detecting one or more sensitive fields within the message based on the determined type of the message, anonymizing values of the one or more sensitive fields within the message while leaving the predefined structural format intact, and transmitting the anonymized message including the one or more anonymized values with the predefined structural format remaining intact to the service providing computing system. The system can anonymize data from a private network before it is transmitted to a public service.

21 Claims, 6 Drawing Sheets

DATA SANITIZATION SYSTEM FOR PUBLIC HOST PLATFORM

TECHNICAL FIELD

This application generally relates to a data sanitization system and more particularly, to a system, method, and non-transitory computer readable medium which anonymize sensitive client information from a message while leaving a data structure of the message intact including non-sensitive information thereby allowing the client data to be processed anonymously by a third party service.

BACKGROUND

Public cloud services are a form of cloud computing in which an organization relies on a third-party cloud service provider for services such as servers, data storage, applications, enterprise computations, and the like, which are delivered to the organization through the Internet. Public cloud services can free companies from the expensive costs of having to purchase, manage and maintain their own on-premises hardware and software infrastructure. Public clouds are also deployed significantly faster and with more scalability and accessibility than on-premises infrastructure as a result of the public cloud provider's expertise and existing infrastructure. Organization are even able to develop their own applications while having the applications hosted by the public cloud.

However, public cloud services are typically provided by third parties giving these third parties access to sensitive information of the organization and its members. The sensitive information includes personally identifiable information (PII) which is any information about an individual (or a user device associated with the individual) which can be used to distinguish or trace the individual's identity. PII is often exploited by criminals for identity theft, or to aid in the planning of criminal acts. Because of the threat of theft of PII, many jurisdictions have passed legislation requiring the protection of PII. In addition, organizations are also motivated to protect private company information that is sensitive to their business even if it is not classified as PII.

SUMMARY

In one example embodiment, provided is a computing system that includes one or more of a processor that may receive a message transmitted from a client device, the message including a predefined structural format for processing by a service providing computing system, determine a type of the message and detect one or more sensitive fields within the message based on the determined type of the message, and anonymize values of the one or more sensitive fields within the message while leaving the predefined structural format intact, and a network interface that may transmit the anonymized message including the one or more anonymized values with the predefined structural format remaining intact to the service providing computing system.

In another example embodiment, provided is a computer-implemented method that includes one or more of receiving a message transmitted from a client device, the message including a predefined structural format for processing by a service providing computing system, determining a type of the message and detecting one or more sensitive fields within the message based on the determined type of the message, anonymizing values of the one or more sensitive fields within the message while leaving the predefined structural format intact, and transmitting the anonymized message including the one or more anonymized values with the predefined structural format remaining intact to the service providing computing system.

In another example embodiment, provided is a non-transitory computer readable medium having stored therein program instructions that when executed cause a computer to perform one or more of receiving a message transmitted from a client device, the message including a predefined structural format for processing by a service providing computing system, determining a type of the message and detecting one or more sensitive fields within the message based on the determined type of the message, anonymizing values of the one or more sensitive fields within the message while leaving the predefined structural format intact, and transmitting the anonymized message including the one or more anonymized values with the predefined structural format remaining intact to the service providing computing system.

In one example embodiment, provided is a computing system that includes one or more of a network interface that may receive an anonymized message transmitted from a proxy system, the anonymized message including a predefined structural format, anonymized values included in one or more sensitive data fields of the message, and non-identifying values in remaining data fields of the message, and a processor that may identify data to be processed from the remaining data fields in the message and execute a process on the identified data from the remaining data fields without using the anonymous values included in the one or more sensitive data fields to generate a processing result for the anonymized message, wherein the processor may further control the network interface to transmit a response message to the proxy system based on the generated processing result.

In another example embodiment, provided is a computer-implemented method that includes one or more of receiving an anonymized message transmitted from a proxy system, the anonymized message including a predefined structural format, anonymized values included in one or more sensitive data fields of the message, and non-identifying values in remaining data fields of the message, identifying data to be processed from the remaining data fields in the message and executing a process on the identified data from the remaining data fields without using the anonymous values included in the one or more sensitive data fields to generate a processing result for the anonymized message, and transmitting a response message to the proxy system based on the generated processing result.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
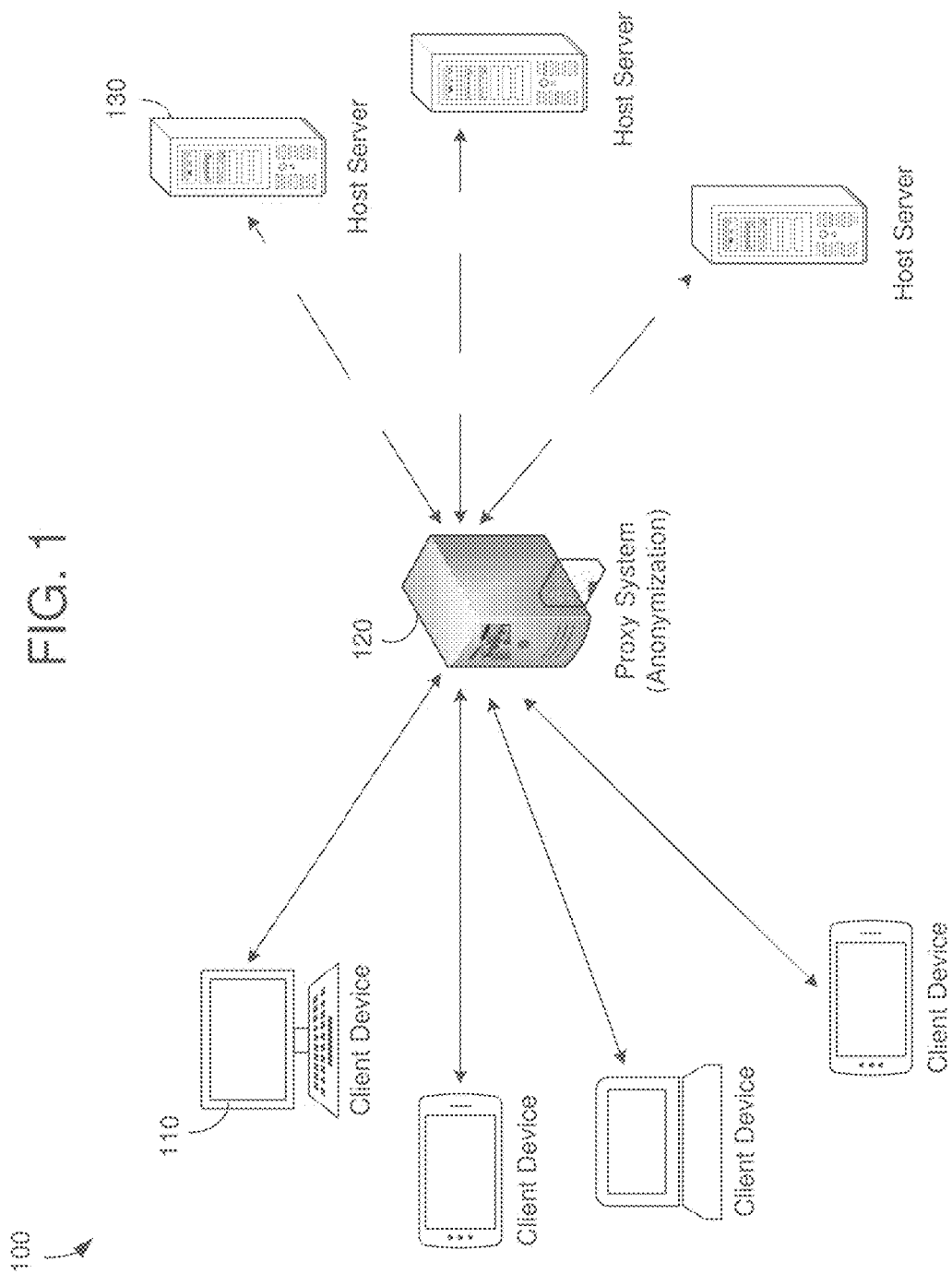
FIG. 1 is a diagram illustrating a sanitization system for a public host platform in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application relates a data sanitization system, and in particular, to a proxy system of a private network that removes sensitive personally identifying information from a message prior to the message being delivered to a public cloud thereby enhancing the security of personal information of users of the private network. In addition, the embodiments also provide a cloud service system that receives an anonymized message with anonymized data values in sensitive data fields and non-identifying values in remaining data fields. The cloud service system can execute or otherwise run a service on client data from the non-identifying values of the message and generate a processing result. Furthermore, the cloud service system can transmit a response message to the proxy system based on the processing result. In this example, the response message may include the anonymized data values in the sensitive data fields without having any personally identifiable information. The proxy may use a key identifier that is embedded within the anonymized sensitive data fields to decrypt the sensitive data, determine the client, and transmit the processing result to a corresponding client system.

In order to prevent fraud and other criminal activity, organizations that use third-party cloud services for data processing and storage should make sure the data sent to the cloud is protected if it includes any PII or sensitive information. The example embodiments provide a system for sanitizing sensitive or Personally Identifiable Information (PII) for data processing and storage in the public cloud and allows organizations to utilize third-party cloud services without the risk of exposing sensitive data such as PII data.

Related systems may attempt to encrypt all client/message data before sending the data to the cloud. This might be an acceptable solution if cloud is only used for storing and/or sharing the data amongst the parties that have access to the decryption keys. However, it makes it impossible for any third-party cloud services that do not have the encryption keys to decrypt the data and perform data operations. Furthermore, this procedure encrypts all of the data even if only a small percentage of it contains or sensitive information, increasing processing overhead. Other related systems may maintain decryption servers in the cloud or rely on the cloud service provider to protect the data so they have access to the plaintext information for processing. However, these have the drawback of having to trust another entity to protect the PII or sensitive data during transfer, storage and processing and that the PII otherwise sensitive data can be decrypted and accessed outside of the organization to which it belongs.

The example embodiments are directed to a system that acts as a proxy between the organization's personal data and third-party (e.g., public) cloud services and selectively anonymizes (e.g., encrypts, obscures, etc.) only the PII or sensitive information in the text or binary data before it is sent to the cloud, without changing the structure of the data message/fields. This allows the cloud service being used to process the data correctly, without any risk of exposing the PII or sensitive data. The system also allows for decrypting the data when results are received back from the cloud service and provides a way to regularly change encryption keys to comply with best security practices, while making sure data already stored encrypted with old keys in the cloud can still be decrypted. Furthermore, the proxy may be part of a private network. Accordingly, plaintext PII and sensitive data and the keys used to encrypt/decrypt the data may never leave the private enterprise, removing the risk of exposing sensitive or PII data while using public cloud.

FIG. 1 illustrates a sanitization system 100 for a public host platform in accordance with an example embodiment. Referring to FIG. 1, the system 100 includes a plurality of client devices 110 which may be part of a private network (e.g., enterprise resource network, etc.), a proxy system 120, and a plurality of host servers 130 that host public services such as cloud-based public services for performing data processing and operations on the public cloud. According to various aspects, the proxy system 120 (e.g., local network server) may also be part of the private network including the client devices 110, however, embodiments are not limited thereto. During a communication process between a client device 110 and a host server 130, the proxy system 120 may intercept or otherwise receive a message transmitted by the client device 110 and intended for the host server 130, and sanitize the message to remove or otherwise anonymize sensitive client information. As a result, the message the is ultimately sent to the host server 130 may be completely anonymous to the host server 130. In the example of FIG. 1, one proxy system 120 is shown. However, it should be appreciated that the system 100 may include multiple proxy systems 120 (e.g., at different local servers of the private network) to serve different segments of client devices 110 on the private network.

According to various embodiments, the proxy system 120 anonymizes sensitive data from the client by performing an encryption of a value of the data field resulting in an encrypted data value for the sensitive data field. Furthermore, the proxy system 120 may add a key identifier of the encryption key used to the encrypted data value (or somewhere else in the message) prior to transmitting the message to the host service 130. The host server 130 may execute a third party service on the non-identifying data included in the message without using the anonymous data, and generate a processing result. Furthermore, the host server 130 may transmit a response message back to the proxy system 120 based on the processing result. The response message may include the anonymous data values in the sensitive data fields.

In response, the proxy system 120 can decrypt the encrypted fields returned from the cloud service hosted by host server 130 based on the key identifier. The key identifier may be a unique private identifier for the encryption key used to encrypt the data that is included with the data sent to the cloud. The key identifier is used by the system to locate the decryption key needed to decrypt the data received back from the cloud service but does not include any information for a third party to reconstruct the decryption key. The key identifier may be appended or otherwise added to the message field encrypted by the proxy system 120 before the proxy system 120 sends the data to the cloud. If any of the fields in the processing results received back from the cloud service host server 130 includes a key identifier, the proxy system 120 may deduce that the field contains data that it had encrypted, locates the correct decryption key using the key identifier, and decrypts the field before forwarding the results to the corresponding client device 110 that is accessing the cloud service.

The use of the proxy system 120 allows for easily changing the encryption keys used for new data, while making sure data already stored in the cloud with the old keys can still be decrypted even if the cloud service used does not allow updating the data once it is stored. In this example, a new key identifier may be appended to the newly encrypted data while older data received from the service is decrypted with the old keys that are located by their key identifier. The old keys can be stored on the proxy system 120 until the end of the data retention period of the cloud service being used. If the cloud service that will process or analyze the data is expecting structured data with a predetermined format for the fields that need to be encrypted/sanitized, then a field format preserving encryption algorithm is used. In this case, the key identifier is appended as an extra field or an existing field that's not processed by the cloud service being used is replaced with the key identifier.

Figure 2:
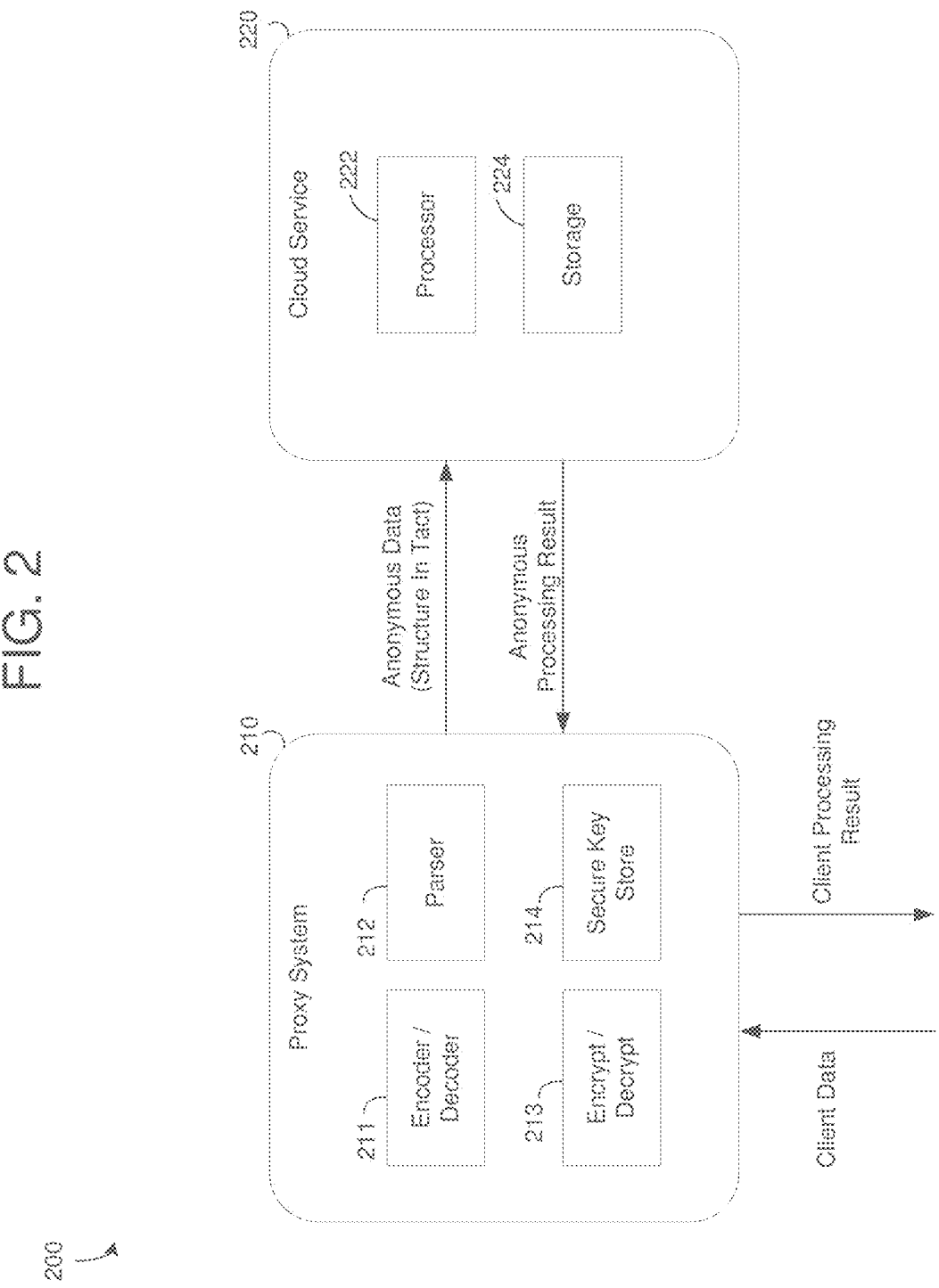
FIG. 2 is a diagram illustrating a sanitization proxy communicating with a public cloud service in accordance with an example embodiment.

FIG. 2 a sanitization proxy communicating with a public cloud service in accordance with an example embodiment. In this example, client data is intercepted by the proxy system 210 (which corresponds to the proxy system 120 in FIG. 1). The proxy system 210 in this example includes an encoder/decoder module 211, a parser 212, a encryption/decryption module 213, and a secure key store 214 that stores encryption keys and a lookup table for key identifiers. The proxy system 210 is not limited to sanitizing text formats such as text documents, HTML, XML, JSON, log data, events, etc. It also supports sanitizing binary formats such as various document formats and NetFlow/IPFIX flow data via the help of customized encoder/decoder modules.

According to various aspects, the proxy system 210 may determine a data type of the message, invoke the corresponding decoder 211 and pass the decoded data to the parser 212 to identify the PII and/or other sensitive data fields for encryption. The sensitive data fields within the message are then encrypted by the encryption/decryption module 213 and then re-encoded in the original format by the encoder module 211 and forwarded to the cloud service. The forwarded data is completely anonymous to the cloud service 220, however, the data message has a predefined structural format that remains intact thereby allowing the cloud service 220 to execute a software process on the remaining data (i.e., the non-identifying data) that remains the anonymous message. For example, the cloud service 220 may include a processor 222 that executes one or more programs/services stored in storage 224 on the anonymous message data.

Furthermore, based on the processing result, the cloud service 220 generates a response message which includes the same anonymous data within the sensitive data fields and transmits the response message to the proxy system 210. A similar process is followed by the proxy system 210 for the data received from the cloud service 220 for decoding, decrypting and re-encoding the decrypted data. The proxy system 210 may provide built-in encoder/decoders for common binary formats as well as the ability to plugin custom encoder/decoders. Furthermore, because the proxy system 210 stores key identifiers in the secure key storage 214, the proxy system 210 can detect a message field that includes a key identifier, and decrypt the message field based on a decryption key linked to the key identifier thereby revealing the personally identifiable information of the client system. Accordingly, the proxy system 210 may forward the processing result to the corresponding client system.

In some cases, the data sanitization proxy system may be available to clients on the enterprise network, only. Clients accessing the cloud services outside of the enterprise network, for example on a mobile device while travelling, can still use the cloud service but will only be able to see encrypted values for the PII and sensitive data fields. The plaintext PII and sensitive data and the keys used to encrypt/decrypt them never leave the private enterprise. This may be used to ensure PII and sensitive data are not exposed to a public network or service while allowing the use of a public service to process the data containing the PII or sensitive data.

Which fields are considered PII/sensitive can be configurable by the sanitization proxy admin and can also include data that's not considered PII but the organization considers sensitive. Examples of sensitive information include social security numbers, employee names, employee phone numbers, internal IP addresses, etc. Furthermore, the sensitive information may be different based on a type of cloud service being performed by the cloud service 220. Non-limiting examples of cloud services include cloud security brokers, cloud security log analyzers, cloud log archivers, cloud statistical data analyzers, cloud storage services, and the like. The client data being sanitized can be in any format including JSON, text, xml, csv, syslog, windows security event logs, custom format, etc. The sanitization proxy system 210 does not need to understand the format of the data it is processing. In addition, data transfer between the client, the proxy system 210, and the cloud service 220, can be in HTTP/HTTPS protocol (web requests) as that's the protocol used by most cloud services.

To generate the sensitive data fields, the proxy administrator may configure regular expressions or other information that identify type of messages that may contain sensitive data and configures the regular expressions that match the PII/sensitive fields within each type of message. As the data is coming in from the client, the proxy system 210 may recognize the message types that need to be processed using the configuration. The proxy 210 can then apply the regular expressions that were configured for that type of message and replace only the matching sensitive fields without changing the format of the data and forwards the message to the cloud service 220. In some embodiments, the proxy system 210 may come with default regular expressions already built-in for common PII fields such as phone numbers, social security numbers, etc. but the administrator can define their own regular expressions for any other type of data they want sanitized.

Figure 3:
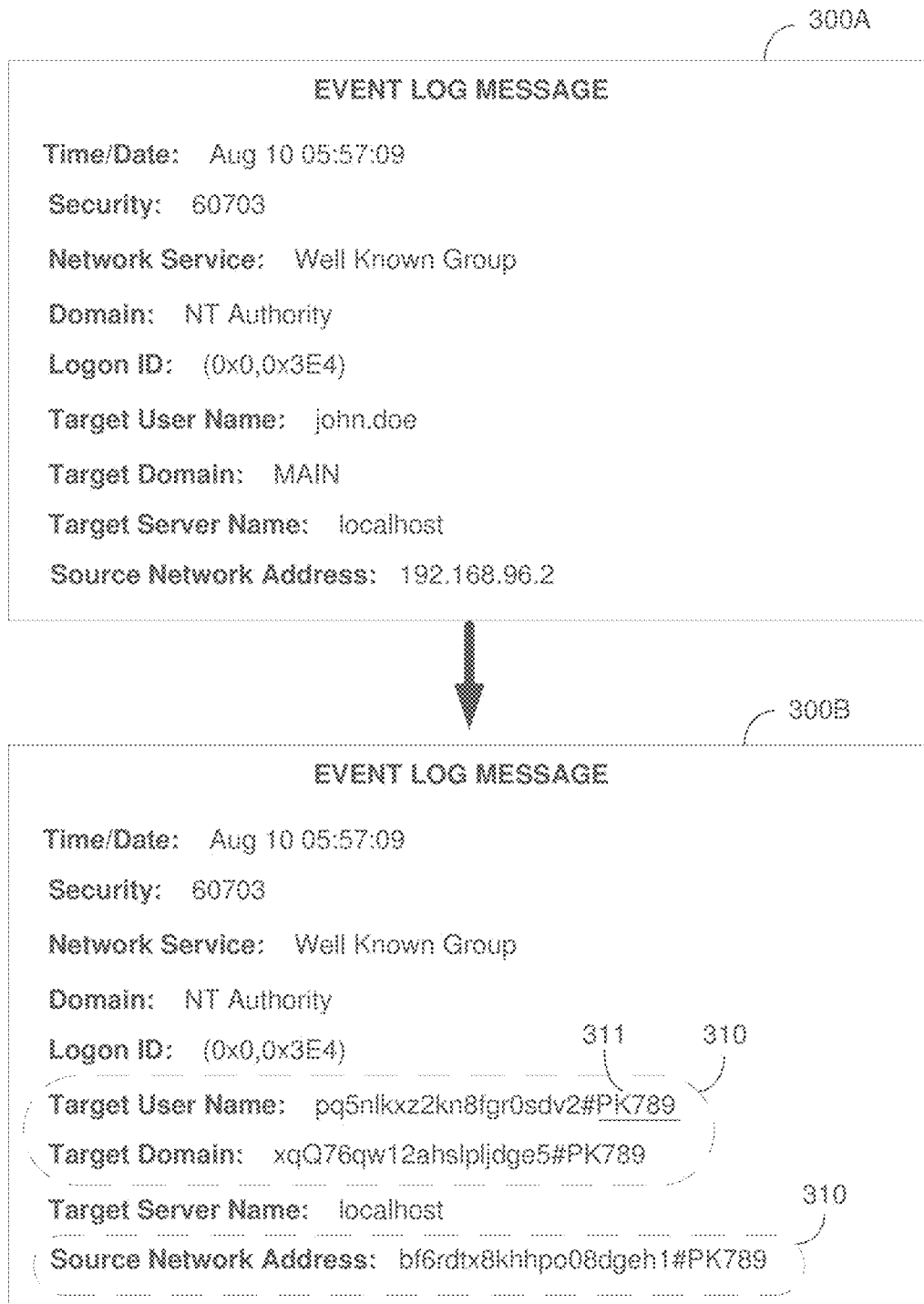
FIG. 3 is a diagram illustrating a process of anonymizing sensitive client data from a message in accordance with an example embodiment.

FIG. 3 illustrates a sanitization process of anonymizing sensitive client data from a message in accordance with an example embodiment. In this example, an event log message 300A is received from a client device, and the proxy system generates an anonymous message 300B with a predefined structural format of the event log message remaining intact. In particular, the proxy system encrypts values of sensitive data fields including user name, target domain, and network address, and inserts the encrypted values into the anonymous message 300B. In addition, the proxy adds a key identifier 311 to an end of an encrypted value for each sensitive data field within the field. However, the embodiments are not limited thereto, and the key identifier may be inserted elsewhere in the message such as a header or a field that is not being used for this type of service.

For example, an organization may want to use a cloud security broker or a security log analyzer to analyze their internal logs for any evidence of intrusions or suspicious activities. The organization may have WINDOWS® and LINUX® devices that generate logs in a WINDOWS® security log format and a LINUX® syslog format. Hence, the organization may choose a cloud log analyzer cloud service that supports these formats. The organization may configure the internal log collector devices to send the logs to the cloud service but they want to make sure the PII and sensitive data within the logs are not sent to the cloud. Accordingly, the sanitization proxy system can be configured to intercept the data being sent to the cloud log analyzer and sanitize it before forwarding it on.

For example, the sanitization system intercepts a Windows security event log message 300A as shown in FIG. 3. Here, the sanitization system is configured to recognize WINDOWS® security event logs and LINUX® syslog logs. The proxy system may identify the message as a security event log message using its configuration. The proxy system may then check what it needs to do with this type of message. The proxy administrator has configured to sanitize the user name, target domain and the source network address fields from the security event log messages using regular expressions that identify these fields. The sanitization system encrypts these fields without changing the format of the original message so that the cloud log analyzer can still recognize it as a security event log and process it. The proxy converts the message 300A into an anonymous message 300B. However, the structure of the original message is left intact but the sensitive fields are replaced. For example, the employee name john.doe is replaced with an encrypted/hash and a key identifier PK789 is of the encryption key used is added to an end of the encrypted value.

When the cloud service generates a processing result, it can respond with a message including information about the processing result as well as hash/encrypted values similar included in the anonymous message 300B. The sanitization proxy may intercept this response from the cloud service, and detect the fields that it has encrypted, locates the encryption key PK789 in its lookup table, decrypts and replaces the fields without changing the data structure and forwards the message to its destination client.

Although not shown in FIG. 3, in some examples, the cloud service being used may check the length of a field or format of a field. In this example, the sanitization proxy can be configured to use a format-preserving encryption. For example, if the cloud log analyzer expects the value of the "Source Network Address" field to be in IP Address format, then the sanitization proxy admin can configure the system to use a format-preserving replacement for that field and standard encryption replacement for the other fields. The fields that require format preservation are encrypted using format-preserving encryption algorithms and the key identifier of the key can be inserted into an unused field or appended to the message as a new field. This is also configurable by the proxy admin.

Different encryption keys may be used by the proxy system for different cloud services. For example, if the organization is using a cloud log analyzer service and another statistical analyzer service, different keys may be used for each service even if the same data is being sent to both services. Also, for the messages sent to a single cloud service, the key usage is configurable. All fields within the messages can use the same key or certain fields can be configured to use different keys. However, all fields of one type may use the same key if correlation between different messages is required. In the example above, all user name fields are encrypted with key PK789 but all source network address fields can be encrypted with PK790. The log analyzer service may report "Too many login attempts" for user "john.doe" after it sees many log messages with the same user name within a given time period. For this to work, all user name fields may be encrypted with the same key for the given period. Also, new keys can be generated for each cloud service at the proxy administrator's discretion. Old keys may be stored for the period configured by the administrator to allow old data to be decrypted.

Figure 4:
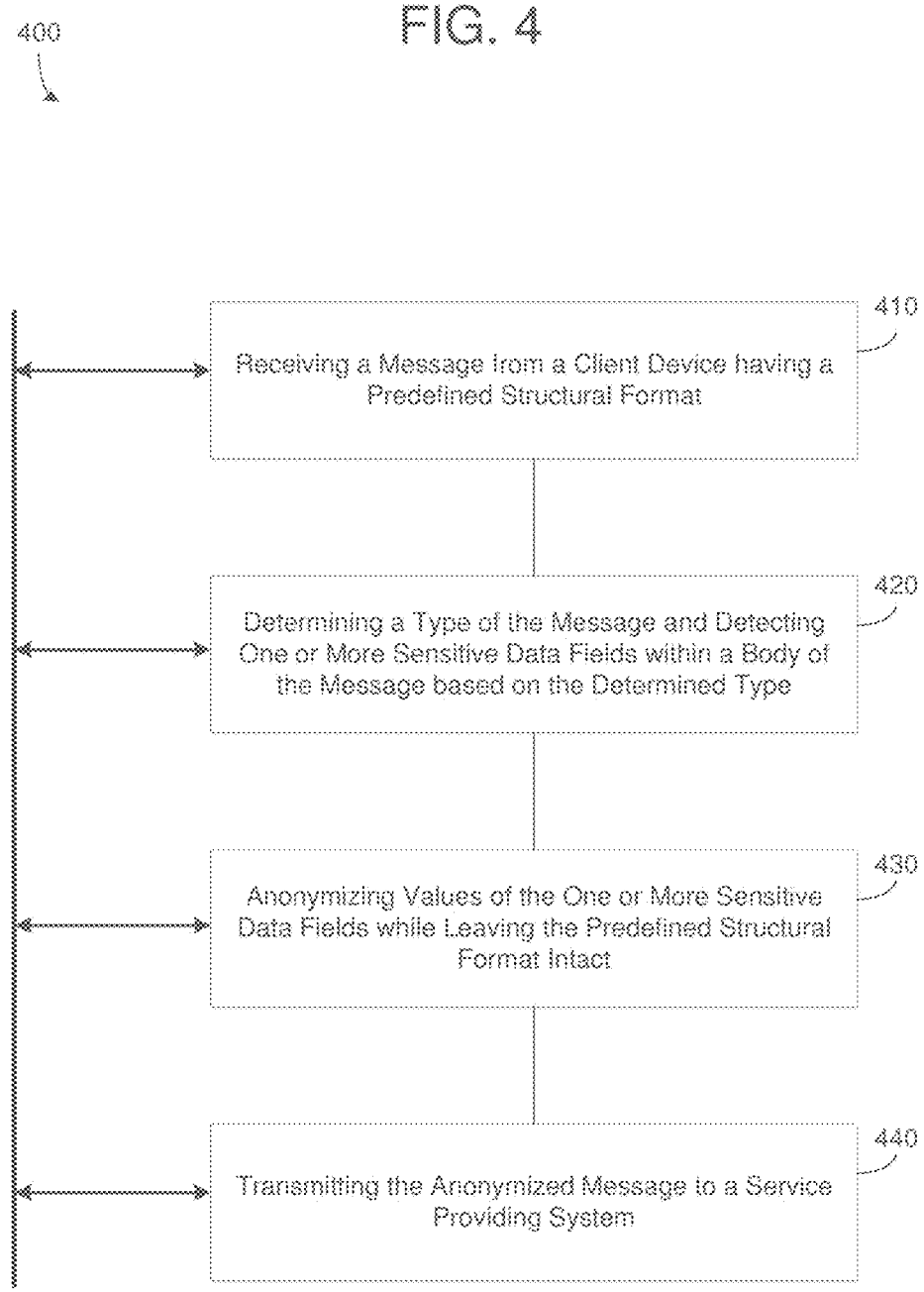
FIG. 4 is a diagram illustrating a method for sanitizing data in accordance with an example embodiment.

FIG. 4 illustrates a method 400 a method for sanitizing data in accordance with an example embodiment. For example, the method 400 may be performed by a proxy system such as the proxy system 120 shown in FIG. 1. Also, the method 400 may be performed by a computing device such as a server, a user device, a cloud platform, or the like. The method 400 may be used to obscure, remove, or otherwise hide sensitive information such as PII that is capable of identifying a user, a user device, or the like. In 410, the method may include receiving a message transmitted from a client device. For example, the message may have a predefined structural format used by a cloud service or other public service that processes client data included in the message. For example, the cloud service may be an enterprise resource function or the like that operates on client data from an enterprise resource network. Services may include inventory management, purchasing, finance, human resources, and the like. However, the embodiments are not limited to enterprise resource services and may be used with any third party services and functions.

In 420, the method may include determining a type of the message and detecting one or more sensitive fields within the message based on the determined type of the message.

For example, the message type may be determined based on a cloud service that the message is destined for from among a plurality of cloud services. Each service may use different data fields within the message based on the functions that are performed by the service. Therefore, different PII may be included in the message received from the client device based on the service being performed. The detecting performed in 420 may identify different PII fields within a body or an interior of the message based on a type of the service to be performed.

In 430, the method may include anonymizing values of the one or more sensitive fields within the message while leaving the predefined structural format intact, and in 440, transmitting the anonymized message including the one or more anonymized sensitive fields with the predefined structural format remaining intact to the service providing computing system. For example, the anonymizing may include encrypting or otherwise obscuring the PII values within the interior of the message while leaving values of remaining fields (i.e. that do not include PII) within the body of the message intact. The anonymizing may include encrypting a value of a sensitive field using an encryption key and adding a key identifier of the encryption key to the body of the message.

According to various aspect, the proxy system may add (e.g., append, postpend, etc.) a value of the key identifier (e.g., an alphanumeric value) to an encrypted value that is stored within the sensitive data field of the message. In order to keep track of the key identifiers, the proxy system may store a lookup table including key identifiers and corresponding encryption keys of each key identifier, in a storage device. Accordingly, the data may leave the proxy system being completely anonymized with the only identifying information being the key identifier of the encryption key (which is only known to the proxy system). Accordingly, the message data may be accessed and analyzed by a third party such as a public cloud service without divulging personally identifiable information of a client.

Although not shown in FIG. 4, in some embodiments the method may further include receiving a response message from the service providing computing system that includes a processing result of the service providing computing system and the one or more anonymized sensitive data fields. In response, the method may include decrypting the one or more anonymized sensitive data fields, determining that the client device is associated with the processing result based on the decrypted sensitive data fields, and transmitting the processing result to the client device. For example, the method may refer to the lookup table including the correlation between key identifiers and encryption keys.

Figure 5:
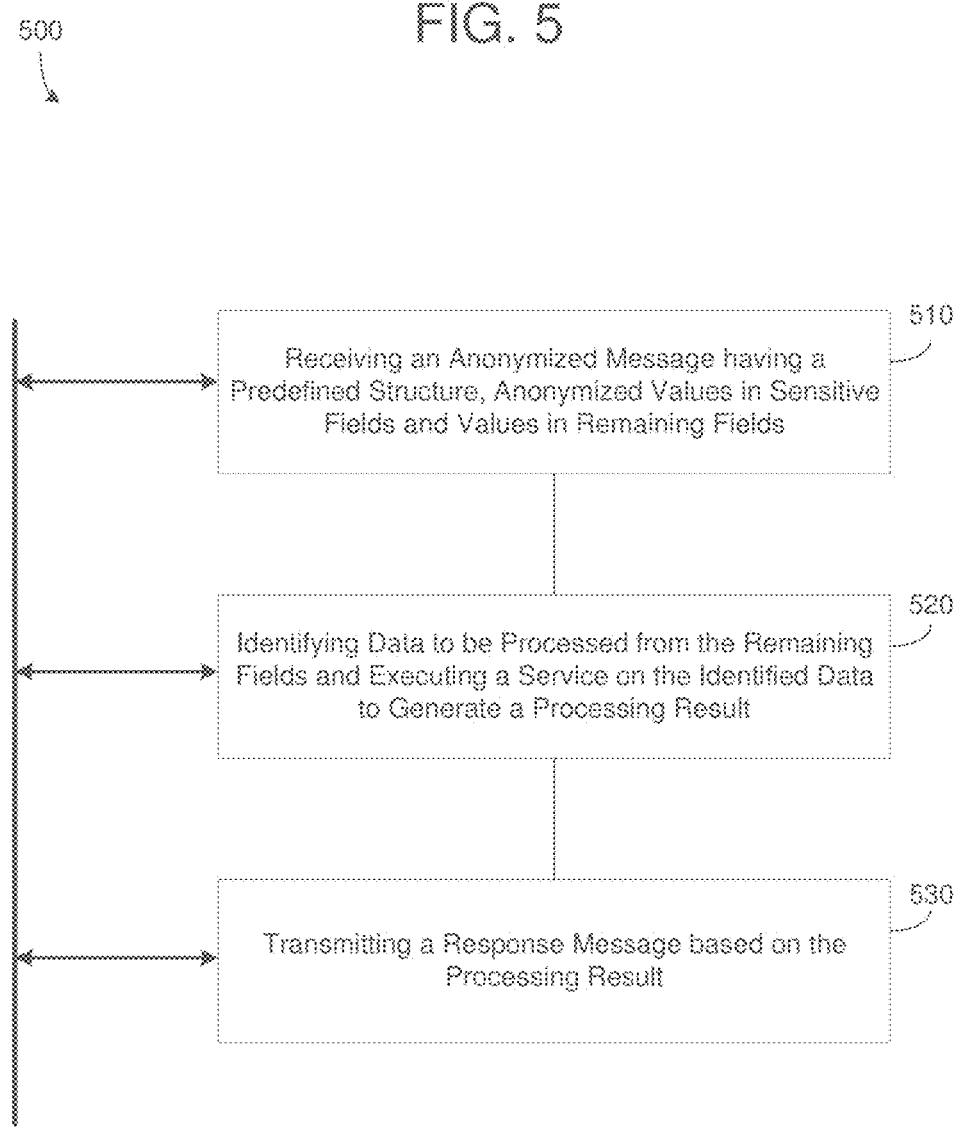
FIG. 5 is a diagram illustrating a method for receiving and processing sanitized data in accordance with an example embodiment.

FIG. 5 illustrates a method 500 for receiving and processing sanitized data in accordance with an example embodiment. For example, the method 500 may be performed by a public cloud service host such as a host platform 130 shown in FIG. 1. Also, the method 500 may be performed by a computing device such as a server, a user device, a cloud platform, or the like. Referring to FIG. 5, in 510, the method may include receiving an anonymized message transmitted from a proxy system. For example, the anonymized message may have a predefined structural format for processing by a cloud service and may include anonymous data that has been substituted into one or more sensitive fields of the message and non-identifying client data values in other remaining fields. In addition, the message may also include client data for processing such as via a public cloud service or other third party application.

For example, the one or more sensitive fields with anonymous data may each include an encrypted value that is encrypted using an encryption key. Different message fields may be encrypted using different keys by the proxy system. The encryption keys may be unknown to the service processing system. In addition, the message may include a key identifier for each field that has been encrypted. The key identifier may identify the encryption key used by the proxy system. According to various aspects, the one or more sensitive fields with the anonymous data each correspond to personally identifiable information (PII) of a client device.

In 520, the method may include identifying data to be processed from the remaining fields of data of the message and executing a process on the identified data from the remaining fields without using the anonymous data to generate a processing result. For example, the processing may execute a public cloud service such as an ERP service or the like on data included within the message. In 530, the method may include generating and transmitting a response message including the processing result and including the one or more sensitive fields with anonymous data, to the proxy system.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
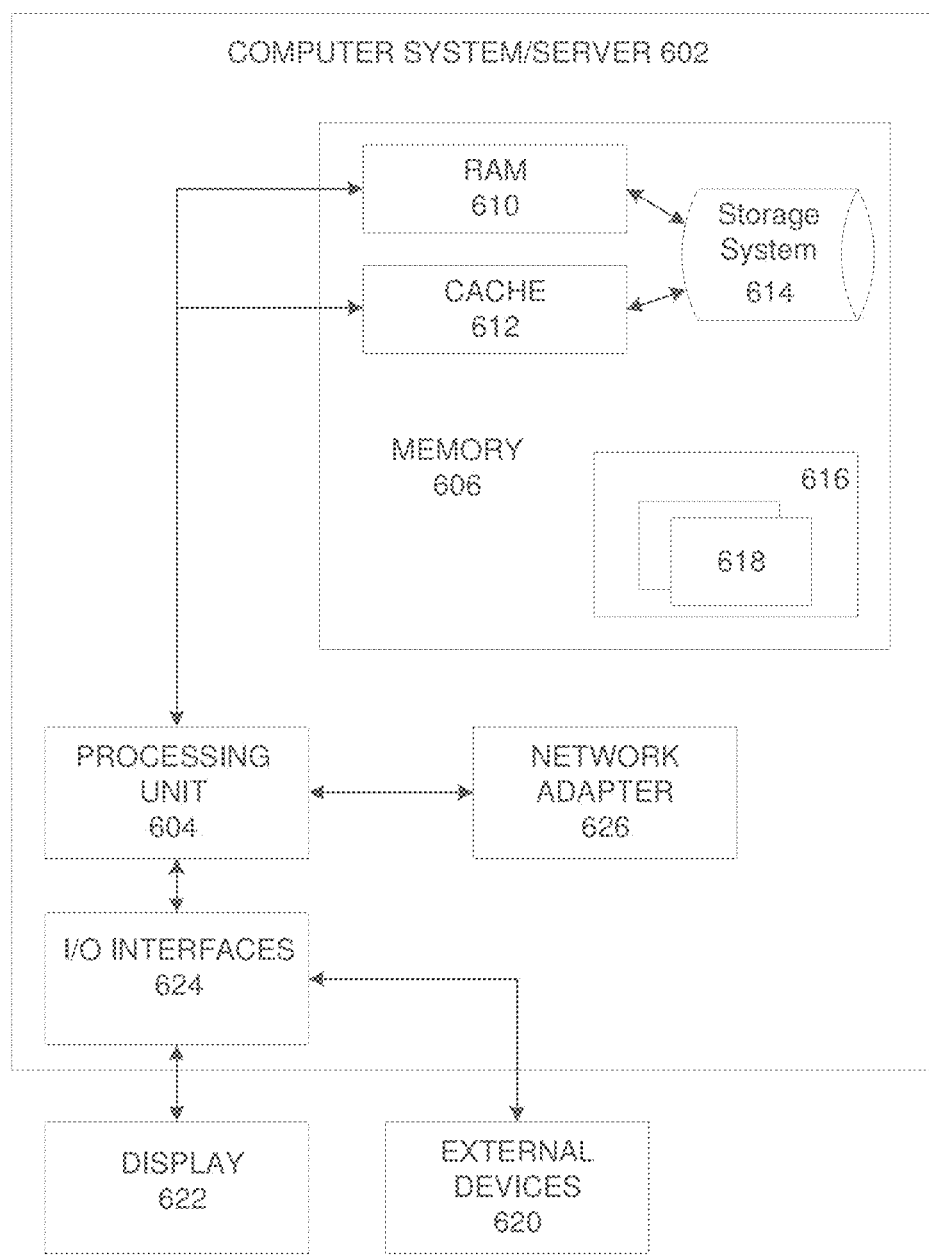
FIG. 6 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc. The computer system 600 may be a single device or a combination of devices. For example, the computer system 600 may be a blockchain node, a database, a server, a cloud platform, a network, a combination thereof, and the like.

FIG. 6 is not intended to suggest any limitation as to the scope of use or functionality of embodiments of the application described herein. Regardless, the computing system 600 (or node 600) is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in computing node 600 is shown in the form of a general-purpose computing device. The components of computer system/server 602 may include, but are not limited to, one or more processors or processing units 604 (i.e., processors), a system memory 606, and a bus that couples various system components including system memory 606 to processor 604. The computing node 600 may be the proxy system 120 shown in FIG. 1, the host system 130 shown in FIG. 1, or another device or combination of devices such as a server, cloud platform, database, user device and/or the like. Also, the computing node 600 may perform each of the method 400 shown in FIG. 4 and/or the method 500 shown in FIG. 5.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626 (also referred to as a network interface). As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

According to various embodiments, the processor 604 may receive a message transmitted from a client device. The message may be transmitted from a client device that is connected to the computing system 602 via a network (e.g., network interface 626). The network may be a local network, a private network, an enterprise resource network, a public network, or the like. The message may include a predefined structural format defined by specific fields which are used for processing by a service providing computing system such as a public cloud service. Depending on the cloud service to be used, the message may have different fields of sensitive information (e.g., PII, internal organization information, etc.) filled out. The processor 606 may determine a type of the message and detect one or more sensitive fields within the message based on the determined type of the message. Furthermore, the processor 606 may anonymize values of the one or more sensitive fields within the message while leaving the predefined structural format intact to generate an anonymized message. The network interface 626 may transmit the anonymized message to the service providing computing system.

In some embodiments, the processor 606 may manage a lookup table stored in the storage 604 which includes a linkage between key identifiers and corresponding encryption keys of each key identifier. When the computing system 602 transmits the anonymized message to the cloud service, the anonymized message does not have any identifying information that identifies a client or a client device that transmitted the message. Here, the proxy may completely anonymize (e.g., encrypt PII) the data of the message. To enable the proxy can decrypt the message when a response is returned from the cloud service, the processor 606 may embed or otherwise add a key identifier to the encrypted data value included in the message field. This key identifier may not mean anything to the cloud service but can be used by the proxy system to decrypt the PII when a response message including the encrypted values is returned. Furthermore, the proxy system can deliver the processing result message to the client device based on the decrypted PII.

According to various other embodiments, the computing system may correspond to a host server of a public cloud service. In this example, the network interface 626 may receive an anonymized message transmitted from a proxy system. For example, the anonymized message may include a predefined structural format, anonymized values included in one or more sensitive data fields of the message, and non-identifying values in remaining data fields of the message. The processor 604 may identify data to be processed from the remaining data fields in the message and execute a process on the identified data from the remaining data fields without using the anonymous values included in the one or more sensitive data fields to generate a processing result for the anonymized message. Furthermore, the network interface 626 may transmit a response message to the proxy system based on the generated processing result.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A computing system comprising:
   a processor configured to
      receive a message transmitted from a client device, the message comprising a plurality of predefined fields for processing by a service providing computing system,
      encrypt values of one or more personally-identifying fields among the plurality of predefined fields within the message based on an encryption key,
      insert the encrypted values in place of the values inside the personally-identifying fields while leaving values of remaining non-identifying fields among the plurality of predefined fields within the message unchanged to generate an anonymized message with its service data payload intact, and
      insert a key identifier of the encryption key into a personally-identifying field of the anonymized message having an encrypted value therein; and a network interface configured to transmit the anonymized message with its service data payload intact to the service providing computing system and receive an anonymized response message including a processing result, wherein the processor is further configured to decrypt an encrypted value in the response message using a decryption key identified based on the previously inserted key identifier, determine that the client device is associated with the processing result based on the decrypted value, and transmit the processing result to the client device.

2. The computing system of claim 1, wherein the processor is configured to detect one or more fields within a body of the message that contain personally identifiable information (PII) values and encrypt the PII values while leaving values of remaining fields within the body intact to generate the anonymized message.

3. The computing system of claim 1, wherein the key identifier comprises an alphanumeric value and the processor is configured to sequentially append a first character of the alphanumeric value of the key identifier to a last character of an encrypted value inside a personally-identifying field of the anonymized message.

4. The computing system of claim 1, wherein the processor is further configured to store a lookup table including key identifiers and corresponding encryption keys of each key identifier, in a storage device.

5. The computing system of claim 1, wherein the response message includes a processing result generated by the service providing computing system and the one or more encrypted values inserted into the transmitted anonymized message.

6. The computing system of claim 1, wherein the key identifier inserted within the anonymized message is configured to locate the decryption key for decrypting the one or more encrypted values in a look-up table.

7. The computing system of claim 1, wherein the anonymous response message includes the one or more encrypted values, the key identifier, and processed information generated by processing non-sensitive data included in the anonymized message.

8. A computer-implemented method, comprising:
receiving a message transmitted from a client device, the message comprising a plurality of predefined fields for processing by a service providing computing system;
encrypting values of one or more personally-identifying fields among the plurality of predefined fields within the message based on an encryption key and inserting the encrypted values in place of the values inside the personally-identifying fields while leaving values of remaining non-identifying fields among the plurality of predefined fields within the message unchanged to generate an anonymized message with its service data payload intact;
inserting a key identifier of the encryption key into a personally-identifying field of the anonymized message having an encrypted value therein; and
transmitting the anonymized message with its service data payload intact to the service providing computing system and receiving an anonymized response message including a processing result,
wherein the method further comprises decrypting an encrypted value from the response message using a decryption key identified based on the previously inserted key identifier, determining that the client device is associated with the processing result based on the decrypted value, and transmitting the processing result to the client device.

9. The computer-implemented method of claim 8, wherein the detecting comprises detecting, by a proxy system, one or more fields within a body of the message that contain personally identifiable information (PII) values, and encrypting, by the proxy system, the PII values while leaving values of remaining fields within the body intact to generate the anonymized message.

10. The computer-implemented method of claim 8, wherein the key identifier comprises an alphanumeric value and the inserting comprises sequentially appending a first character of the alphanumeric value of the key identifier to a last character of an encrypted value inside a personally-identifying field of the anonymized message.

11. The computer-implemented method of claim 8, wherein the method further comprises storing a lookup table including key identifiers and corresponding encryption keys of each key identifier, in a storage device.

12. The computer-implemented method of claim 8, wherein the response message includes a processing result generated by the service providing computing system and the one or more encrypted values inserted into the transmitted anonymized message.

13. The method of claim 8, wherein the key identifier inserted within the anonymized message is configured to locate the decryption key for decrypting the one or more encrypted values in a look-up table.

14. The method of claim 8, wherein the anonymous response message includes the one or more encrypted values, the key identifier, and processed information generated by processing non-sensitive data included in the anonymized message.

15. A non-transitory computer readable medium having stored therein program instructions that when executed cause a computer to perform a method comprising:
receiving a message transmitted from a client device, the message comprising a plurality of predefined fields for processing by a service providing computing system;
encrypting values of one or more personally-identifying fields among the plurality of predefined fields within the message based on an encryption key and inserting the encrypted values in place of the values inside the personally-identifying fields while leaving values of remaining non-identifying fields among the plurality of predefined fields within the message unchanged to generate an anonymized message with its service data payload intact;
inserting a key identifier of the encryption key into a personally-identifying field of the anonymized message having an encrypted value therein; and
transmitting the anonymized message with its service data payload intact to the service providing computing system and receiving an anonymized response message including a processing result,
wherein the method further comprises decrypting an encrypted value from the response message using a decryption key identified based on the previously inserted key identifier, determining that the client device is associated with the processing result based on the decrypted value, and transmitting the processing result to the client device.

16. The non-transitory computer readable medium of claim 15, wherein the detecting comprises detecting, by a proxy system, one or more fields within a body of the message that contain personally identifiable information (PII) values, and encrypting, by the proxy system, the PII values while leaving values of remaining fields within the body intact to generate the anonymized message.

17. The non-transitory computer readable medium of claim 15, wherein the key identifier comprises an alphanumeric value and the inserting comprises sequentially appending a first character of the alphanumeric value of the key identifier to a last character of an encrypted value inside a personally-identifying field of the anonymized message.

18. The non-transitory computer readable medium of claim 15, wherein the method further comprises storing a lookup table including key identifiers and corresponding encryption keys of each key identifier, in a storage device.

19. The non-transitory computer readable medium of claim 15, wherein the response message includes a processing result generated by the service providing computing system and the one or more encrypted values inserted into the transmitted anonymized message.

20. The non-transitory computer readable medium of claim 15, wherein the key identifier inserted within the anonymized message is configured to locate the decryption key for decrypting the one or more encrypted values in a look-up table.

21. The non-transitory computer readable medium of claim 15, wherein the anonymous response message includes the one or more encrypted values, the key identifier, and processed information generated by processing non-sensitive data included in the anonymized message.

\* \* \* \* \*